US005394454A

United States Patent [19]

Harding

[11] Patent Number: 5,394,454

[45] Date of Patent: Feb. 28, 1995

[54] FILTER METHOD FOR AN X-RAY SYSTEM, AND DEVICE FOR CARRYING OUT SUCH A FILTER METHOD

[75] Inventor: Geoffrey Harding, Hamburg, Germany

[73] Assignee: U.S. Philips Corporation, New York, N.Y.

[21] Appl. No.: 60,174

[22] Filed: May 7, 1993

[30] Foreign Application Priority Data

May 9, 1992 [DE] Germany ............................ 4215343

[51] Int. Cl.$^6$ ........................................... G01N 23/203

[52] U.S. Cl. ........................................ 378/86; 378/88; 378/156

[58] Field of Search ................. 378/98.11, 98.12, 98.2, 378/86, 87, 88, 89, 156, 157

[56] References Cited

U.S. PATENT DOCUMENTS

| | | | |
|---|---|---|---|
| 4,541,106 | 10/1985 | Belanger et al. | 378/98.11 |
| 4,611,341 | 9/1986 | Brody | 378/98.11 |
| 4,750,196 | 6/1988 | Harding . | |
| 4,903,287 | 2/1990 | Harding | 378/119 |
| 4,945,552 | 7/1990 | Ueda et al. | 378/98.11 |
| 5,150,395 | 9/1992 | Kosanetzky et al. | 378/86 |
| 5,157,074 | 10/1992 | Metzger et al. | 524/589 |
| 5,204,888 | 4/1993 | Tamegai et al. | 378/156 X |

FOREIGN PATENT DOCUMENTS 4034602 5/1992 Germany .

OTHER PUBLICATIONS

"Dual-Energy Compton Scatter Tomography", Harding et al., Phys. Med. Biol. 1986, vol. 31, No. 5, pp. 477–489.

"Elastic and Compton Scattering With W Kα X-Radiation", by Cooper et al., The Journal of Physics E, vol. 18, 1985, pp. 354–357.

*Primary Examiner*—David P. Porta

*Attorney, Agent, or Firm*—Jack D. Slobod

[57] ABSTRACT

A filter method and device for carrying out the method in conjunction with an X-ray system having a beam path for primary radiation between an X-ray source and an examination zone and a beam path for scattered radiation between the examination zone and a detector device, involve subtractive combination of first and second measurement signals produced by the detector device in response to scattered radiation received in first and second filter arrangements. For production of the first measurement signal a filter is arranged in the beam path for primary radiation and not in the beam path for scattered radiation, while for production of the second measurement signal a filter is arranged in the beam path for scattered radiation and not in the beam path for primary radiation. The latter filter consists of the same material as the filter used for the first measurement, and may be the same filter.

10 Claims, 3 Drawing Sheets

FILTER METHOD FOR AN X-RAY SYSTEM, AND DEVICE FOR CARRYING OUT SUCH A FILTER METHOD

The invention relates to a filter method for an X-ray system as well as to a device for performing this filter method. The Journal of Physics E, vol. 18, 1985, pp. 354–357 describes a filter method for an X-ray system in which an examination zone is irradiated, the X-rays from the examination zone being measured by a detector device. According to the known method, a first measurement is performed with a first filter arranged in the beam path between the X-ray source and the examination zone and a second measurement is performed with a second filter. The two filters have different absorption edges and are proportioned so that they have the same absorption or transmission for all X-ray quanta outside the energy range between the absorption edges of the two filters. When the results of the two measurements are subtracted from one another, a difference value is obtained which is dependent only on the spectral components of the polychromatic X-ray source which are situated within the energy range between the two absorption edges.

It is an object of the invention to propose a different filter method. This object is achieved in accordance with the invention by means of a filter method for an X-ray system comprising an X-ray source emitting X-ray quanta and a detector device which supplies at least one measuring signal for detecting the X-ray quanta having interacted with an object in an examination zone, which method comprises the following steps:

a) a first measurement is performed during which a filter is arranged in the beam path between the X-ray source and the examination zone.

b) a second measurement is performed during which a filter consisting of the same material as the filter used during the other measurement is arranged in the beam path between the examination zone and the detector device.

c) the measurement signals obtained from the two measurements are subtractively combined.

Whereas according to the known method filters consisting of a different material are each time arranged in the beam path between the X-ray source and the examination zone during two measurements, in accordance with the invention during one measurement a filter is arranged in the beam path between the X-ray source and the examination zone whereas during the other measurement a filter is arranged in the beam path between the examination zone and the detector device, the filter material being the same in both cases. Therefore, the same filter can be used for both measurements. However, it is alternatively possible to use two filters consisting of the same material.

The invention utilizes the fact that X-ray quanta can interact with an object in the examination zone in various ways:

1) in the case of elastic scattered radiation (Rayleigh scattering) the direction of the X-rays changes, but not their energy.

2) in the case of inelastic (Compton) scattered radiation, the X-ray quanta lose energy in the event of a change of direction. The loss of energy depends on the magnitude of the change of direction and on the energy of the X-ray quanta.

3) in the case of photoelectronic Bremsstrahlung, an X-ray quantum interacting with an atom releases an electron mainly from the K-shell, giving rise to a photoelectron (X-ray quantum) whose energy is smaller than the energy of the primary X-ray quantum by an amount necessary to release the electron from the K-shell. This energy amount increases as the third power of the atomic number of the atom in the periodic system.

The method in accordance with the invention enables separation of the components of scattered radiation produced by the different interactions with the examination zone.

In a first elaboration of the invention, an essentially monochromatic X-ray source is used, the filter material having an absorption edge at a quantum energy which is slightly lower than the energy of the X-ray quanta emitted by the monochromatic X-ray source, the X-ray quanta being detected by the detector device at an angle which is larger than the angle at which the energy loss of the X-ray quanta due to Compton scattering corresponds exactly to the difference between the energy of the X-ray quanta and the quantum energy at which the filter has its absorption edge. This method enables determination of the scattering cross-section for elastic (coherent) scattered radiation or also for inelastic (incoherent) scattered radiation.

In a further version of the invention, use is made of an essentially monochromatic X-ray source, the filter material having an absorption edge at a quantum energy which is slightly lower than the energy of the X-ray quanta emitted by the monochromatic X-ray source, the X-ray quanta being detected by the detector device at an angle which is smaller than the angle at which the energy loss of the X-ray quanta by Compton scattering corresponds exactly to the difference between the energy of the X-ray quanta and the energy of the X-ray quanta at which the filter material exhibits an absorption edge, the quantum energy being measured in an energy resolving manner. According to this version, the components stemming from Compton and Rayleigh scattering can be suppressed, leaving only components produced by photoelectronic Bremsstrahlung. In a (wide) range of examination the contents of materials having a low atomic number, for example carbon, oxygen or nitrogen can thus be determined.

According to a further version of the invention use is made of a polychromatic X-ray source, scattered radiation emanating at a predetermined scatter angle range being measured by the detector device. The measurement values obtained after subtractive combination of the measurement signals are determined only from X-ray quanta within a given energy band; the effect of the other X-ray quanta is eliminated by the subtractive combination.

The invention will be described in detail hereinafter with reference to the drawings. Therein:

Figure 1:
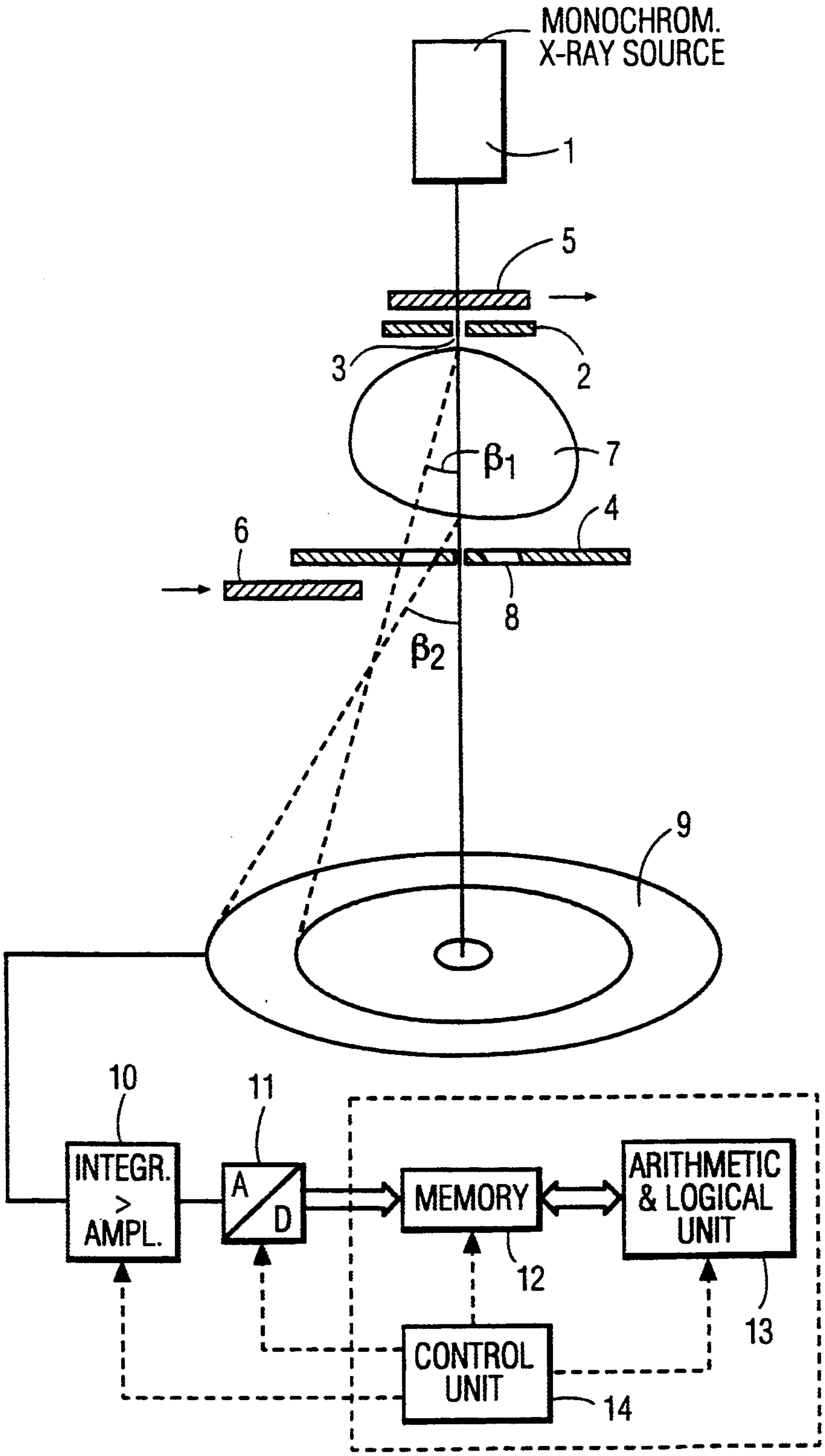
FIG. 1 shows a device for carrying out the filter method in accordance with the invention.

The reference numeral 1 in FIG. 1 denotes an X-ray source which emits monochromatic X-rays; the X-ray quanta emitted by the source 1 thus essentially have the same energy. A diaphragm 2, provided with a central aperture, transmits only a pencil beam 3 of the X-ray beam emitted by the X-ray source 1. The pencil beam 3 traverses a central aperture in a further diaphragm plate 4. The two diaphragm plates 2 and 4 bound, in the direction perpendicular to the pencil beam 3, an examination zone in which an object 7 to be examined is situated. The X-ray quanta in the pencil beam 3 interact with the object 7 to be examined and generate inter alia elastic and inelastic scattered radiation. The scattered radiation which is generated between a minimum angle $\beta_1$ and a maximum angle $\beta_2$ in the object 7 to be examined can reach an annular detector 9 via an annular aperture 8 in the diaphragm 4 which is concentric with the pencil beam 3. The detector signal is amplified by an integrating amplifier 10 and converted into a digital data word by an analog-to-digital converter. This data word is proportional to the number of X-ray quanta detected by the annular detector 9 during an integration interval or a measuring period, and is independent of the energy of the X-ray quanta.

The data word can be stored in a memory 12 and processed in an arithmetic and logic unit (ALU) 13. The units 10–13 are controlled by a control unit 14. The units 12–14 may form part of a microprocessor.

The performance of a measurement method by means of the device shown in FIG. 1 will be described hereinafter. First a first measurement is performed. During this first measurement, in the beam path between the monochromatic X-ray source 1 and the examination zone 7 there is arranged a filter 5 which has an absorption edge at a quantum energy $E_k$ which is slightly lower than the energy of the X-ray quanta emitted by the X-ray source 1.

Figure 2:
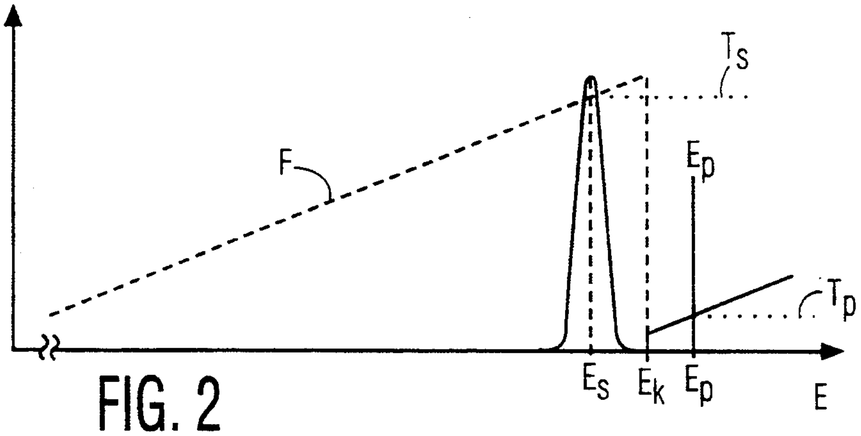
FIG. 2 shows a spectrum obtained at the side facing away from the X-ray source of the examination zone in the case of one embodiment.

FIG. 2 shows the energy spectrum, i.e. the intensity of the X-rays as a function of the energy of the X-ray quanta. The spectrum contains a line $E_p$ and a component $E_s$ of low energy. The line $E_p$ is caused by elastic scattering at which the X-ray quanta do not lose energy as is known. Therefore, the energy $E_p$ is also the energy of the X-ray quanta emitted by the X-ray source 1. The component $E_s$ is caused by Compton scattering. During this inelastic scattering process, the X-ray quanta lose energy in conformity with the relation:

$$\frac{1}{E_S} - \frac{1}{E_P} = c(1 - \cos\beta) \quad (1)$$

Therein, $E_p$ is the energy of the X-ray quantum before the scattering process, $E_s$ is the energy of the X-ray quantum after the scattering process, c is a constant and $\beta$ is the angle enclosed by the path of the scattered X-ray quanta relative to the direction of the pencil beam 3.

For the equation (1) it is assumed that the electrons are stationary. However, in reality these electrons move. This leads to a broadening of the Compton line (Compton shift). In this case the equation (1) describes the energy of the Compton peak. For scattering at a small scatter angle the width of the Compton peak is small.

The widening of the component $E_s$ in comparison with the component $E_p$ is additionally caused by the fact that X-ray quanta can reach the detector ring 9 at different scatter angles. When it is substantially ensured that scattered radiation can reach the detector device only at a definite scatter angle, substantially a single line is obtained for the component $E_s$. This can be achieved, for example by utilizing a primary radiation beam in the form of a cone instead of a needle-shaped primary beam, the diaphragm 4 being formed by the collimator member which is concentric with the symmetry axis of the cone, as described per se in DE-OS 40 34 602.

Filter 5 shown in FIG. 1 is made of a material having an absorption edge at a quantum energy $E_k$ which is slightly smaller than the energy of the X-ray quanta emitted by the X-ray source but larger than the energy $E_s$ of the X-ray quanta influenced by the scattering process. In FIG. 2 the variation of the transmission of this filter as a function of the energy of the X-ray quanta is diagrammatically represented by a dashed curve F. The transmission monotonously increases until the absorption edge, after which it drops to a lower value and subsequently increases again. The transmission of the filter 5 for the energy of the primary radiation is denoted by the reference $T_p$, the (higher) transmission of the filter for the energy $E_s$ being denoted by the reference $T_s$. By arranging the filter 5 at the area between the X-ray source and the examination zone, the spectral components $E_s$ and $E_p$ are reduced to the same extent, that is to say in conformity with the transmission factor $T_p$.

At the end of the measuring period, the analog-to-digital converter 11 supplies a signal which is proportional to the time integral over the intensity.

Subsequently, a second measurement is performed during which, as denoted by arrows, the filter 5 is moved out of the beam path and a filter 6 is moved into the beam path between the examination zone 7 and the detector device 9. The filter 6 should consist of the same material as the filter 5 and may have the same thickness. In the latter case, the use of one filter would suffice, said filter being arranged above, i.e. at the side of the examination zone facing the X-ray source, the examination zone for one measurement and underneath, i.e. at the side of the examination zone facing away from the X-ray source, the examination zone for the other measurement. The filter 6 does not influence the scattered components $E_p$ and $E_s$ to the same extent. The component $E_p$ is attenuated by the filter 6 to the same extent as by the filter 5. However, the component $E_s$ is attenuated less, because $T_s$ is greater than $E_p$. The period of time available for this measurement corresponds to the measuring period during the preceding measurement.

After the two measurements, the difference can be formed between the signals obtained from the two measurements. Because the component $E_p$ is attenuated to the same extent by the filters 5 and 6 during the two measurements, the difference between the measurement signals is dependent only on the component $E_s$ produced by Compton scattering. Therefore, the difference signal is a measure of the Compton scattering.

When a filter consisting of the same material has the filter 6 but having a thickness which is a factor $T_s/T_p$ greater is used in the beam path between the examination zone and the detector device, the component $E_s$ undergoes the same attenuation during the two measurements, whereas the component $E_p$ is suppressed more during the second measurement. Therefore, when the difference is again formed between the measurement signals produced by the two measurements, the difference signal is independent from $E_s$ and hence a measure of the elastic scattered radiation. However, the same result can also be obtained when a filter of the same material and the same thickness as the filter 5 is arranged in the beam path between the examination zone and the detector device 9, and the intensity of the pencil beam 3 or the measuring period is increased by the factor $T_s/T_p$.

A modification of the device shown in FIG. 1 enables calculation of the scattering cross-section of the voxel for elastic and/or nonelastic scattered radiation. To this end, a diaphragm device must be arranged between the detector device 9 and the examination zone 7, via which the detector arrangement can "see" only one voxel on the pencil beam 3 of the examination zone 7. (In this case it is efficient when the object 7 is movable relative to the other components of the device, or vice versa, but not perpendicularly to the pencil beam 3 but also in the direction of the pencil beam 3, so that each voxel within the body 7 can be examined as desired.) The following then holds for the measurement signals S1 and S2 produced by the two measurements:

$$S1 = I_p T_p (A_e + A_i) \quad (2)$$

$$S2 = I_p (T_p A_e + T_s A_i) \quad (3)$$

Therein, $A_e$ and $A_i$ are factors proportional scattered cross-sections for elastic (Rayleigh) and inelastic (Compton) scattered radiation, respectively, and $I_p$ is the intensity in the pencil beam 3. The scatter cross-sections can be derived as follows from the equations (2) and (3):

$$I_p A_i = (S_2 - S_1)/(T_s - T_p) \quad (4)$$

$$I_p A_e = (S_1 T_s - S_2 T_p)/(T_s T_p - T_p^2) \quad (5)$$

Equation (5) demonstrates that the cross-section $A_e$ for the elastic scattered radiation can also be determined without modification of the filter thickness, the measuring period or the intensity $I_p$. However, the subtractive combination of the signals S1 and S2 cannot be realised directly by subtraction but rather by a linear combination where the difference of the weighted measurement signals is formed.

As is clearly shown in FIG. 2, the condition for the separation of the components $E_s$ and $E_p$ is that the filter has an absorption edge at a quantum energy $E_k$ which is situated below $E_p$ and above $E_s$. In order to ensure that this is the case, the energy loss $E_p - E_s$ of an X-ray quantum during a Compton scattering process must be sufficiently high. In accordance with the equation (1), the energy loss $E_p - E_s$ increases as a function of the scatter angle. At a given scatter angle the energy loss corresponds exactly to the difference between the energy $E_p$ and the quantum energy $E_k$ at the absorption edge. The scatter angle at which the detector device 9 detects the scattered X-ray quanta, therefore, must be greater than this scatter angle, in order to ensure that elastically scattered X-ray quanta and X-ray quanta inelastically scattered by a Compton process are separated from one another.

Figure 3:
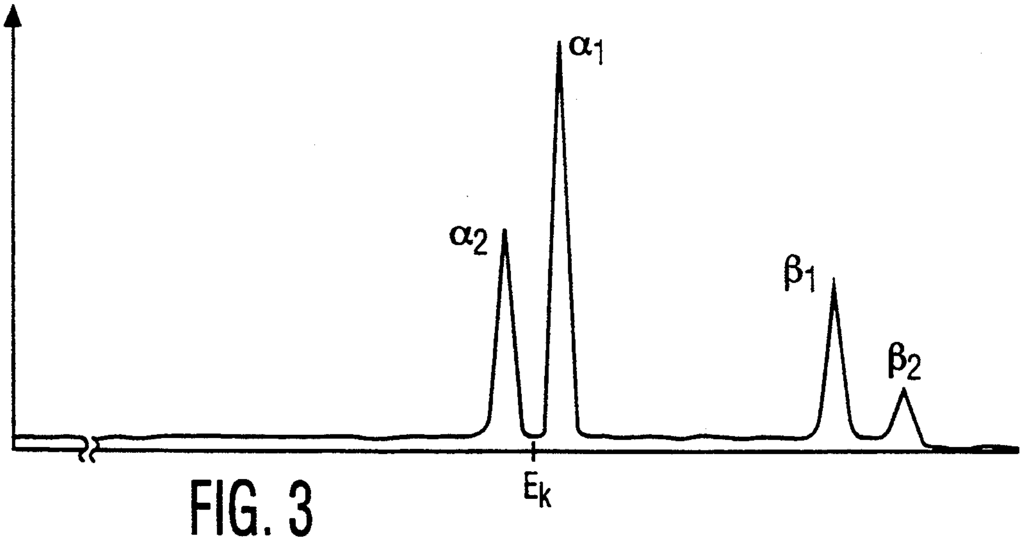
FIG. 3 shows the emission lines of an X-ray source suitable for the method.

Monochromatic X-rays could in principle be generated by means of a radio nuclide. These radiation sources, however, have a low intensity only. A much higher intensity is offered by an X-ray source which first generates monochromatic X-rays which are converted into quasi-monochromatic fluorescent radiation in a target, X-ray sources of this kind are known from EP-OS 292 055, which corresponds to U.S. Pat. No. 4,903,287, and from DE-OS 40 17002. FIG. 3 shows the emission spectrum of such an X-ray source with a target consisting of tantalum. The spectrum of such a source is composed of four K-lines α2, α1, β1 and α2 (in succession of increasing energy). All other fluorescent lines of tantalum, not shown in FIG. 3, have an energy situated far therebelow. The $K_{\alpha 1}$ line has an energy of 57.532 keV, whereas the $K_{\beta 1}$ line is situated approximately 7.5 keV higher. In conjunction with such an X-ray source, a filter of erbium having an absorption edge at a quantum energy $E_k$ of 57.485 keV which is above the $K_{\alpha 2}$ line and below the $K_{\alpha 2}$ line and below the $K_{\alpha 1}$ line is attractive.

The equations (2) and (3) hold for each of the four lines. However, when the emission line and the line arising after scattering are situated either both above or both below the K absorption edge of the filter, $T_p$ and $T_s$ are substantially identical and the contributions of these lines to the signal arising after the subtractive combination of the signals S1 and S2 will cancel one another. The $K_{\alpha 2}$ line and notably the line resulting therefrom by Compton scattering is situated below the absorption edge $E_k$ of the erbium filter. The $K_{\beta 1}$ line and the $K_{\beta 2}$ line and the lines resulting therefrom by scattering are situated above the absorption edge for as long as the energy loss during the scattering processes is less than 2.5 keV or the scatter angle is smaller than 90°. Only the $K_{\alpha 1}$ line makes a contribution, because its energy is situated above the absorption edge, while the line arising therefrom by Compton scattering is situated underneath the absorption edge when the scatter angle amounts to at least 7°.

Slight modifications enable to measure the photoelectronic Bremsstrahlung generated by the pencil beam in the device in FIG. 1 independently from the scattered radiation produced by Compton or Rayleigh scattering. To this end, the detector ring 9 and the diaphragm 4 or the collimator device arranged between the detector ring and the examination zone must be shaped so that the detector ring can receive radiation from the examination zone only at an angle which is greater than 0° and smaller than the scatter angle at which the energy loss by Compton scattering in the area of the difference between the energy of the monochromatic radiation source 1 and the quantum energy at which the filter 5 has an absorption edge; for the described combination of a tantalum fluorescent radiation source and an erbium filter, this angle amounts to 7°. In this case not only the X-ray quanta influenced by elastic scattering but also the X-ray quanta produced by Compton scattering have an energy situated above the absorption edge of the filter 5 or 6. After subtraction of the measurement signals (resulting from the measurements with the filters 5 and 6 in the beam path), the effect of these scatter signals are cancelled.

However, this does not hold for the photoelectronic Bremsstrahlung. This radiation arises when X-ray quanta release each time one electron from the K-shell of an atom, thus producing a photoelectron whose energy is lower than the energy of the primary X-ray quantum. The energy difference relative to the generating (primary) X-ray quantum depends on the atomic number of the atom. For example, for carbon it amounts to approximately 284 eV, to approximately 400 eV for nitrogen, and to 532 eV for oxygen. When it is larger than the energy difference between the quantum energy of the absorption edge and the energy of the monochromatic radiation, as is the case in the event of a tantalum source/erbium filter combination, the energy of the photoelectronic Bremsstrahlung is below the quantum energy of the absorption edge, so that separate proof of this radiation is possible as described with reference to FIG. 2.

This modification offers special advantages when the X-ray quanta are measured in an energy resolving manner. In that case there must be provided a suitable detector 9, for example a germanium detector, which, upon detection of an X-ray quantum, generates a pulsed signal whose amplitude is proportional to the energy of the X-ray quanta. Downstream of the amplifier 10 there must be provided a pulse height analyzer which, for various amplitude ranges, records the number of pulses whose amplitude is within the relevant amplitude range. Thus, for each measurement this pulse height analyzer produces a number of numbers which characterize the measured energy spectrum, i.e. the intensity as a function of the energy.

Figure 4:
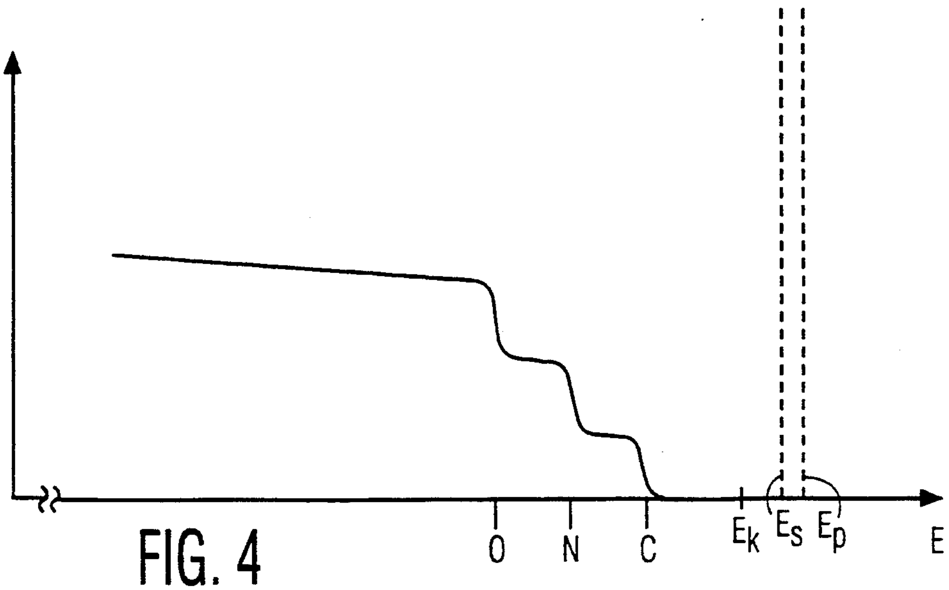
FIG. 4 shows the energy spectrum obtained in another version.

The results to be achieved in this manner can be understood on the basis of FIG. 4 which shows the energy spectrum occurring behind the object to be examined during the two measurements. There is again shown a line $E_p$ which is determined by the energy of the monochromatic radiation and which corresponds, for example to the $K_{\alpha 1}$ line of the tantalum fluorescent radiation. The line produced at $E_s$ by Compton scattering is below $E_p$, but above the quantum energy $E_k$ of the absorption edge of the filter which is active in front of and behind the examination zone, respectively, during the two measurements. Below the absorption edge $E_k$ there is a continuous spectrum, i.e. the photoelectronic bremsstrahlungsspectrum. It is assumed that in the examination zone carbon (C), nitrogen (N) and oxygen (O) are present in the examination zone as elements of lowest atomic number. When an X-ray quantum releases an electron from the K-shell of a carbon atom, there is obtained a bremsstrahlungsspectrum whose highest energy is below $E_k$ and approximately 284 eV lower than $E_p$. The highest energy of the Bremsstrahlung spectrum produced by the nitrogen component is approximately 400 eV below $E_p$, whereas for oxygen the highest energy is approximately 532 eV below $E_p$.

When more than one of the elements C/N/O is present in the examination zone, the short wavelength part of the energy spectrum varies step-wise. The height of each of the steps is a measure of carbon, nitrogen and oxygen components. The ratio of the three components to one another can be determined by suitable curve fitting. Because explosives are known to have a well-defined C/N/O ratio, this method can be used to demonstrate the presence of explosives within a wide examination zone, for example for luggage inspection.

Figure 5:
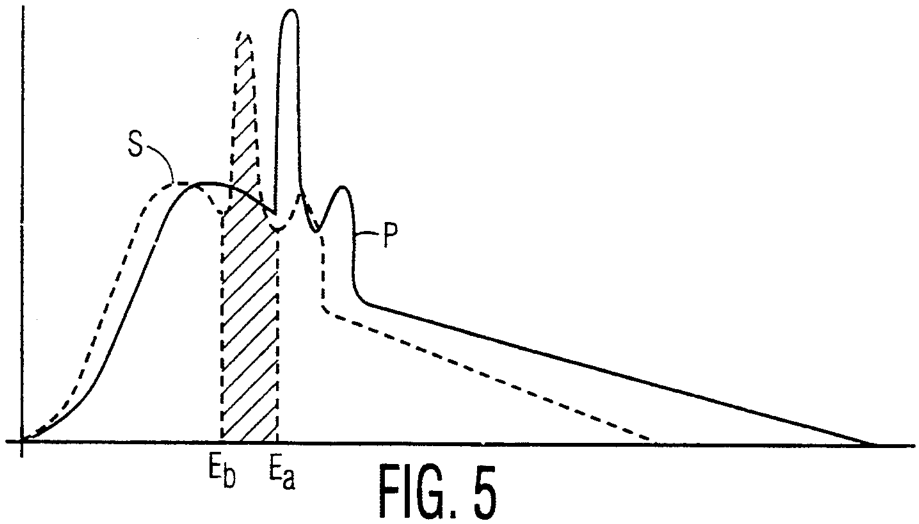
FIG. 5 shows a bremsstrahlungsspectrum in front of and behind the examination zone.
Figure 6:
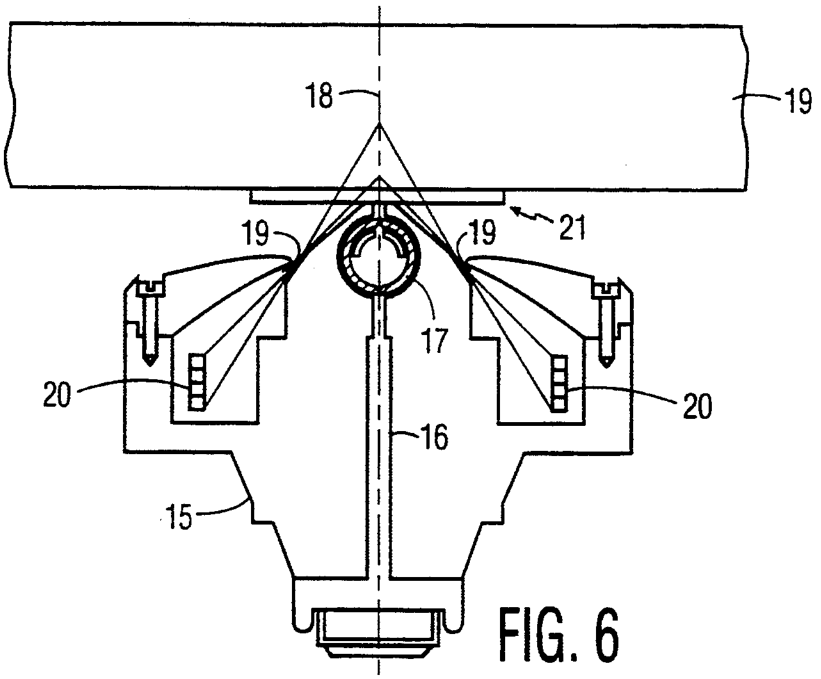
FIG. 6 shows a second version of the method in accordance with the invention.
Figure 7:
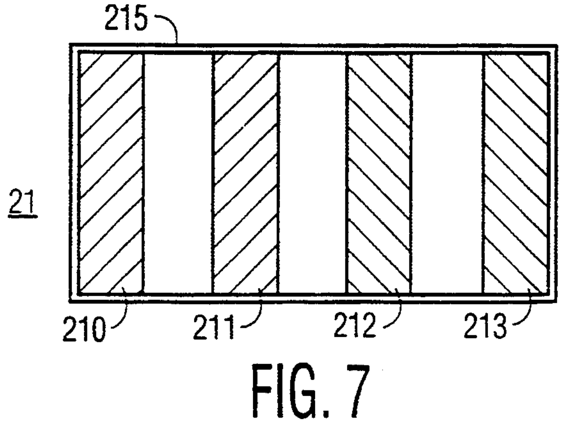
FIG. 7 shows a filter suitable for use in the device shown in FIG. 6.

The FIGS. 5 to 7 serve to illustrate a filter method utilizing polychromatic X-rays. The curve P, denoted by a solid line in FIG. 5, represents the energy spectrum of such an X-ray source which comprises an X-ray tube with a tungsten anode. The typical variation of a bremsstrahlungsspectrum with two intensity peaks in the central energy range, caused by the characteristic radiation of tungsten, can be recognized. The dashed curve S represents the spectrum (be it at a different scale relative to the spectrum P), resulting when X-rays having the energy spectrum P are scattered at a scatter angle of, for example 140° in the examination zone. The radiation scattered at such an angle is produced essentially by Compton scattering processes which, in conformity with equation (1), lead to an energy loss which increases as the energy of the X-ray quanta increases.

When these scattered X-rays are measured and a filter having an absorption edge at the quantum energy $E_a$ is inserted between the examination zone and the detector device during this measurement (for example, a tungsten filter having an absorption edge at approximately 70 keV), a low attenuation occurs for energies of the X-ray quanta below $E_a$ and a high attenuation for energies above $E_a$.

When a further measurement is executed while a filter of the same material is inserted in the beam path between the radiation source and the examination zone, the transmission gradient caused by the absorption edge is situated at the lower energy $E_b$ because of the energy loss during the Compton scattering process. Spectral components above $E_b$ have a high attenuation and spectral components below $E_b$ have a low attenuation.

During both measurements the spectral components below $E_b$ thus undergo a low attenuation and those above $E_a$ experience a high attenuation, be it that the attenuation effect (for the same filter thickness) at the primary side is slightly less than that at a secondary side. When these absorption or transmission differences are eliminated by making the filter at a primary side slightly thicker or by increasing the measuring period accordingly while the thickness of the filters remains the same, when the filter is inserted at the secondary side, the effect of the spectral components below $E_b$ and above $E_a$ is substantially cancelled when the signals obtained during the two measurements are subtracted. This is not the case exclusively in the range between $E_b$ and $E_a$. Therefore, the difference signal corresponds to the signal which would be obtained if only X-ray quanta having an energy of between $E_b$ and $E_a$ would occur in the X-ray source. The described method thus performs bandpass filtering.

For the described embodiment, involving a filter with an absorption edge at 69.5 keV at a scatter angle of 140°, the differentiation produces a bandpass filter which activates X-ray quanta with energies in the range of from 56 keV to 69.5 keV at the secondary side, corresponding to an energy of from 69.5 to 91.5 keV at the primary side. When the tungsten filter is replaced by a cerium filter, having an K absorption edge at 40.45 keV, an energy band between 35.5 and 40.45 keV occurs at the secondary side or a band of 40.45 to 47 keV at the primary side, in the case of a scatter angle amounting to 140°. The width of the energy band activated by this method is dependent on the scatter angle and decreases as a function of the scatter angle. For example, in the case of a scatter angle amounting to 90°, the energy band to be emphasized by means of a tungsten filter extends from 61.2 keV to 69.5 keV at the secondary side and from 69.5 to 80.44 keV at the primary side.

An apparatus for performing the method will be described hereinafter with reference to FIG. 6. The apparatus comprises a measuring probe 15 which comprises a slit 16 extending perpendicularly to the plane of drawing of FIG. 6. From the polychromatic radiation beam from an X-ray source (not shown), the slit 16 forms a fan-shaped radiation beam which is incident on a rotatable roller 17 with a material absorbing the X-rays. In the roller there are provided two helical slits which are offset 180° relative to one another, so that a pencil beam 18 is formed from the fan-shaped radiation beam 17 in any position of the roller, which pencil beam is pivoted in a plane perpendicular to the plane of drawing during each rotation of the roller.

The pencil beam 18 irradiates an object 19 to be examined and generates (Compton) scattered radiation therein. The scattered radiation, being scattered at an angle of approximately 140° relative to the pencil beam, passes through two slits 19 in the measuring head, which slits extend perpendicularly to the plane of drawing and are situated to both sides of the plane defined by the slit 16, said scattered radiation being incident on two detector devices 20 which are arranged in the measuring head and each of which consists of several detector elements. Because of the slit geometry, the detector elements extending perpendicularly to the plane of drawing detect the scattered radiation from different depths of the object.

The device of FIG. 6 as described thus far is known from EP-PS 184 247. However, in accordance with the invention additionally a filter device 21 is arranged in the beam path between the object 19 and the measuring head 15. Via this filtering device, four different measurements are performed in each position of the pencil beam 18.

As appears from FIG. 7, showing the filter device in a position rotated through 90° relative to FIG. 6, the filter device comprises a mount 215 for four filter plates 210 . . . 213. The two filter plates 210 and 211 are made of tungsten and have the same thickness. The two filter plates 212 and 213 are made of cerium and have the same thickness. Between neighbouring filter plates there is a gap wherethrough the X-rays can pass without being influenced exists.

During a first measurement the filter is positioned in the beam path so that the pencil beam 18 can pass between the filter plates 210 and 211 without obstruction.

The scattered radiation, however, is incident on the plates 210, 211 on its way to the slits 19, so that it is influenced thereby. Subsequently, the filter is moved laterally so that during the second measurement the pencil beam 18 passes through the filter plate 211. The scattered radiation then reaches the slit 19 without obstruction. For the reasons described with reference to FIG. 5, the duration of the second measurement is slightly longer than that of the first measurement. The measurement values supplied by each individual element of the detector devices 20 for the same position of the pencil beam 18 and the two positions of the filter device 21, are subtracted. As has already been described with reference to FIG. 5, the difference signal is equivalent to a measurement signal which would be obtained if the spectrum of the X-ray source were limited to a given energy band ($E_b$-$E_a$ see FIG. 5).

After a further displacement of the filter device 21, the cerium filter 212 is irradiated by the pencil beam 18 during a third measurement. The scattered radiation, however, reaches the detector device 20 without obstruction, via the slits 19. After a further displacement of the filter device, the primary beam passes through the clearance between the two cerium filters 212 and 213 during a fourth measurement, said filters then filtering the scattered radiation prior to their passage through the slits 19. For each detector element and for each pencil beam position there is again formed the difference between the signals measured in the third and the fourth position of the filter device, a difference signal being obtained which corresponds to an energy band which is lower than the energy band resulting from the difference between the first and the second measurements carried out by means of the tungsten filters 210, 211.

The object 18 is thus irradiated with two different energies, being an essential aspect of the so-called dual-energy methods. These methods provide additional information concerning the object 18 to be examined. The method in accordance with the invention enables such a dual-energy method to be carried out without it being necessary to change the spectrum of the X-rays generated by the X-ray source, for example by switching of the high voltage applied to the X-ray tube included in the X-ray source. It is not necessary either to measure the X-rays in an energy-resolving manner in order to execute the dual-energy method.

As is described in an article by Harding and Tischler (Phys. Med. Biol. vol. 31, 477–489, 1986), a dual-energy method enables the separate determination of the attenuation by Compton scattering and by photoelectric absorption. To this end, the two sets of difference signals resulting from the four measurements must be combined in the manner disclosed in the cited publication.

I claim:

1. A filter method for an X-ray system, comprising an X-ray source for emitting X-ray quanta and a detector device which supplies at least one measurement signal in order to detect the X-ray quanta having interacted with an object in an examination zone, which method comprises the following steps:

a) a measurement during which a filter is arranged in the beam path between the X-ray source and the examination zone, b) a measurement during which a filter consisting of the same material as the filter used during the other measurement is arranged in the beam path between the examination zone and the detector device, c) subtractive combination of the measurement signals obtained from the two measurements.

2. A filter method as claimed in claim 1, characterized in that an essentially monochromatic X-ray source is used, the filter material having an absorption edge at a quantum energy which is slightly lower than the energy of the X-ray quanta emitted by the monochromatic X-ray source, the X-ray quanta being detected by the detector device at an angle which is larger than the angle at which the energy loss of the X-ray quanta due to Compton scattering corresponds exactly to the difference between the energy of the X-ray quanta and the quantum energy at which the filter has an absorption edge.

3. A filter method as claimed in claim 1, characterized in that an essentially monochromatic X-ray source is used, the filter material having an absorption edge at a quantum energy which is slightly lower than the energy of the X-ray quanta emitted by the monochromatic X-ray source, the X-ray quanta being detected by the detector device at an angle which is smaller than the angle at which the energy loss of the X-ray quanta due to Compton scattering corresponds exactly to the difference between the energy of the X-ray quanta and the quantum energy at which the filter material has an absorption edge, the energy of the X-ray quanta being measured in an energy-resolving manner.

4. A method as claimed in claim 1, characterized in that use is made of a polychromatic X-ray source, scattered radiation emanating in a predetermined range of scatter angles being measured by the detector device.

5. A filter method as claimed in claim 2 or 3, characterized in that use is made of an X-ray source emitting tantalum fluorescent radiation and also of an erbium filter.

6. An X-ray system comprising: an examination zone; an X-ray source for irradiating the examination zone via a beam path for primary radiation; a detector device for detecting radiation exiting the examination zone via a beam path for scattered radiation; filter means selectively arrangeable for filtering radiation either in the beam path for primary radiation or in the beam path for scattered radiation; and means for subtractive combination of first and second measurement signals formed by the detector device at different times.

7. An X-ray system as claimed in claim 6, wherein one of said first and second measurement signals is formed in response to radiation detected while the filter means is arranged for filtering radiation in the primary beam path and the other of said first and second measurement signals is formed in response to radiation detected while said filter means is arranged for filtering radiation in the beam path for scattered radiation.

8. An X-ray system as claimed in claim 6, wherein said X-ray source is polychromatic and said detector device is arranged for detecting radiation scattered at an angle of approximately 90 degrees with respect to the direction of the primary beam path at the examination zone.

9. An X-ray system as claimed in claim 7, wherein said X-ray source is polychromatic and said detector device is arranged for detecting radiation scattered at an angle of approximately 90 degrees with respect to the direction of the primary beam path at the examination zone.

10. An X-ray system as claimed in claim 6, 7, 8, or 9, wherein said filter means comprises at least one flat filter which is displaceable to either a first position in the beam path for primary radiation or a second position in the beam path for scattered radiation.

* * * * *